Aug. 29, 1972 A. N. SAXENA 3,687,722

METHOD OF COATING SELECTIVE AREAS OF THE SURFACE OF A BODY

Filed March 10, 1971

INVENTOR.
Arjun N. Saxena
BY

ATTORNEY

United States Patent Office 3,687,722
Patented Aug. 29, 1972

3,687,722

METHOD OF COATING SELECTIVE AREAS OF THE SURFACE OF A BODY

Arjun Nath Saxena, Princeton, N.J., assignor to RCA Corporation

Filed Mar. 10, 1971, Ser. No. 122,719
Int. Cl. B44d *1/18, 1/50, 1/52*
U.S. Cl. 117—212 4 Claims

ABSTRACT OF THE DISCLOSURE

A pre-selected area of the surface of a body of an electrical insulating or semiconducting material is coated with a film of a material which normally adheres well to the body material. This is achieved by first implanting into the unselected area of the surface of the body ions of a material which prevents good adherence of the material of the film to the body. The film is then coated over the entire area of the surface of the body so that the film has good adherence to the body over the pre-selected area but poor adherence over the ion implanted area. The poorly adhered portion on the film is then removed, such as by ultrasonic agitation.

BACKGROUND OF THE INVENTION

The present invention relates to a method of coating selective areas of the surfaces of an electrical insulating or semiconducting material, and more particularly to a method of coating selective areas of a body of an electrical insulating or semiconducting material with a film of a material which has good adherence to the body.

In the field of electrical semiconductor devices it is the practice to coat the surface of a body of a single crystalline semiconductor material, such as silicon, with a layer of an electrical insulating material, such as silicon dioxide, silicon nitride or aluminum dioxide, and provide films of an electrically conductive metal on selected areas of the insulating layer to interconnect various regions of silicon. The metal films generally extend through openings in the insulating film and contact regions of same or different conductivity types in the semiconductor body to provide the electrodes for such regions. In semiconductor integrated circuits, the metal films also extend over the insulating film along narrow paths to electrically connect the electrodes in a desired circuit. Some integrated circuits include a second layer of an electrical insulating material over the metal film and a second metal film over a selected area of the second insulating material. The second metal film is in the form of pattern of interconnecting strips which provide additional electrical connections between the various regions in the semiconductor body. The metal films so formed on a semiconductor device will hereinafter be referred to as the "metalization pattern."

The metal generally used for the metalization pattern is one which is electrically conductive and which adheres well to the material of the insulating layer. It has been found that the preferred metals are those which inherently form a thin oxide on their surface as they are deposited, such as aluminum, molybdenum, chromium and tungsten, since the thin oxide film achieves a good adherence with the insulating layer. Sometimes films of one or more other metals, are coated over the base metal of the metalization pattern either to protect the base metal and/or to permit terminals to be easily bonded to the metalization pattern. The metalization patterns are generally formed by coating the entire surface of the insulating layer with the metal film and then removing the portion of the metal film which is not over the selected area of the insulating layer. The undesired portions of the metal film are generally removed by etching, either chemically or electrically (e.g., deplating, desputtering, etc.). During the etching process care must be taken so that the insulating layer and the semiconductor body are not damaged or otherwise adversely affected by the particular etchant. If the metalization pattern is formed of two or more superimposed films of different metals, it is often necessary to use different etchants or etching techniques for the various metals. This not only complicates the formation of the metalization pattern but also increases the possibility of damaging the insulating layer on the semiconductor body giving rise to electrical shorts, thereby reducing the the yield of the integrated circuits.

SUMMARY OF THE INVENTION

A pre-selected area of the surface of a body of an electrical or semiconducting material is coated with a film of a material which normally adheres well to the body by first introducing into the surface of the body over the area of the surface except the pre-selected area a material which prevents adherence of the material of the layer to the body. A layer of the coating material is applied over the entire area of the surface of the body and the portions of the coating layer which are on the area of the surface of the body containing the adherence preventing material are removed.

DETAILED DESCRIPTION

The method of the present invention for coating selected areas of a body of an electrical insulating or semiconducting material in general comprises, introducing into the surface of the body a material which prevents adhesion of the coating material with the body. This is done over the entire area of the surface of the body except the selected areas where the coating material is desired. The material introduced into the surface of the body are ions of an element which is a chemical reducing element, such as hydrogen and carbon, and are preferably introduced by ion implantation. The coating material, which is a material which normally adheres well to the material of the body, is then coated over the entire surface of the body. The portions of the coating material which contacts the selected areas of the surface of the body will have good adherence to the surface whereas the portions of the coating material which contacts the implanted area of the surface of the body will have poor adherence to the surface. The portion of the coating material which contacts the implanted areas of the body is then removed. Since this portion of the coating material has poor adherence to the body, it can be easily removed, such as by ultrasonic agitation or by pulling it off with an adhesive coated tape.

Figure 1:
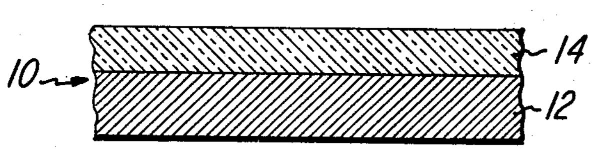
FIGS. 1–4 are sectional views illustrating the various steps of the method of the present invention for coating a selected area of an insulating material.

Referring to the drawings, the method of the present invention will be described in more detail with regard to the formation of a metalization pattern on an insulating layer of a semiconductor device. As shown in FIG. 1, a semiconductor device, generally designated as 10, includes a body 12 of a semiconductor material, such as silicon, germanium or a group III–V semiconductor compound, having a layer 14 of an inorganic electrical insulating material, such as silicon dioxide, silicon nitride or aluminum oxide, on a surface thereof. The semiconductor body 12 is generally provided therein with two or more regions of different conductivity type or Schottky barriers, not shown, to form one or more active semiconductor elements in the body. The insulating layer 14 may be provided on the semiconductor body by any well known technique for depositing the particular insulating material, such as by pyrolytically reacting a gaseous mixture containing the elements of the material to form the material which is deposited on the semiconductor body, by vacuum evaporation or by sputtering. Also, a layer of silicon dioxide can be formed on a silicon body by heating the body in an atmosphere containing oxygen to oxidize the surface of the body and grow the silicon dioxide layer on the surface of the semiconductor body 12.

Figure 2:
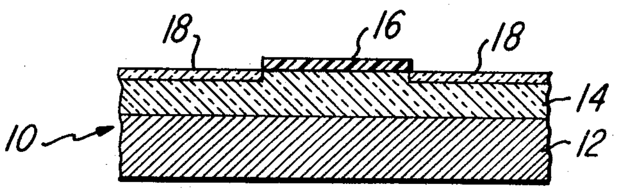

As shown in FIG. 2, a masking layer 16 is coated on the pre-selected area of the insulating layer 14 where the metalization pattern is to be provided. An example of the masking layer 16 is a resist material which is provided on the pre-selected area of the insulating layer 14 by standard photolithographic techniques. Ions of an element which is a chemical reducing element, such as hydrogen or carbon, are then introduced into the exposed area of the surface insulating material. The ions are preferably introduced into the insulating layer 14 by the well known technique of ion implantation such as described in "Ion Implantation in Semiconductors," J. W. Mayer, L. Eriksson and J. A. Davies, Academic Press, New York, 1970. Since the ion implanted layer 18 need only be very thin, the ion implantation can be carried out at relatively low energies, such as in the range of 30 to 60 kv. depending on the particular material being implanted with the ions. Thus, during the ion implantation the ions which contact the masking layer 16 will not penetrate through the masking layer into the pre-selected area of the insulating layer 14 beneath the masking layer. The masking layer 16 is then removed with a suitable solvent.

Figure 3:
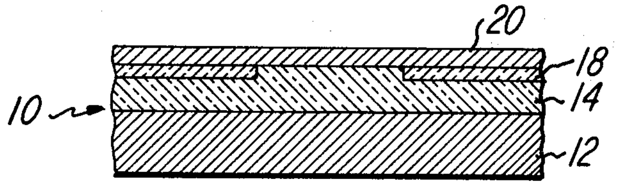
Figure 4:
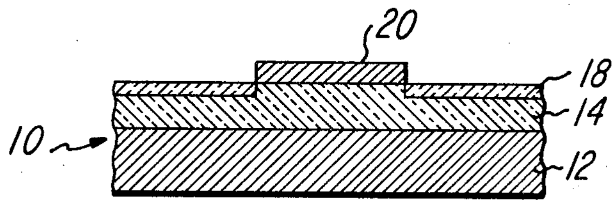

As shown in FIG. 3, a layer 20 of a metal which normally has good adherence with the material of the insulating layer 14 is then coated over the entire surface of the insulating layer. The metals which generally have good adherence to the inorganic insulating materials are those which inherently form a surface oxide, such as aluminum, molybdenum, chromium and tungsten. The metal layer 20 may be coated on the insulating layer 14 by any well known technique, such as vacuum evaporation or sputtering. The portion of the metal film 20 which is coated on the pre-selected area of the insulating layer 14 will have good adherence to the insulating layer, whereas the portion of the metal film coated on the ion implanted layer 18 will have poor adherence to the ion implanted layer. The poor adherence between the metal film 20 and the ion implanted layer 18 results from the fact that the chemically reducing ions in the ion implanted layer 18 prevent the formation of a surface oxide layer on that portion of the metal film. Since there is poor adherence between the metal film 20 and the ion implanted layer 18, the portion of the metal film over the ion implanted layer can be easily peeled off leaving the metal film 20 only on the pre-selected area of the insulating layer 14 as shown in FIG. 4. One method of easily removing the portion of the metal film 20 from over the ion implanted layer 18 is to place the semiconductor devcie 10 in an ultrasonic bath.

In a semiconductor device in which the metalization pattern comprises two or more superimposed metal films, the additional metal films are coated over the metal layer 20 prior to removing the portion of the metal layer from over the ion implanted layer 18. When the portion of the metal layer 20 over the ion implanted layer 18 is removed, the additional metal films on this portion of the metal layer will be removed leaving the multi-layer metalization pattern on the pre-selected area of the insulating layer. Although the method of the present invention has been described with regard to coating pre-selected areas of an insulating layer with a metal, it can be used to coat the selected areas of the insulating layer with other materials which form an oxide bond with the insulating material. For example, for certain types of semiconductor devices, such as insulating gate field effect transistors and integrated circuits, it is sometimes desired to provide on selected areas of an insulating layer a second layer of an insulating material having properties different from that of the first layer such as either silicon nitride or alumnum oxide on silicon dioxide or deposited silicon oxide on thermally grown silicon oxide. Also, although the method of the present invention has been described with regard to coating selected areas of an inorganic insulating material, it can be used to coat selected areas of either an organic insulating material or a semiconducting material, such as silicon, germanium or a group III–V semiconductor compound. In addition, the material being coated may be in the form of either a layer coated on a substrate or a self-supporting body. Thus, there is provided by the present invention a method of coating selected areas of the surface of a body of an insulating or semiconducting material without the need of etching the coating material and thereby eliminating the possibility that the etching technique will damage or otherwise adversely affect either the body being coated or the device in which the body is incorporated.

I claim:

1. A method of coating a pre-selected area of the surface of a body of an electrical insulating or semiconducting material with a layer of a material which normally adheres to the material of the body comprising (a) implanting into the surface of the body over the area of the surface except the pre-selected area ions of a chemical reducing element which prevents adherence of the material of the layer to the material of the body, (b) applying a layer of the coating material over the entire area of said surface of the body, and (c) removing the portions of the coating layer which are on the area of the surface of the body containing the adherence-preventing material.

2. A method in accordance with claim 1 wherein the adherence-preventing material are ions of either hydrogen or carbon.

3. A method in accordance with claim 1 wherein prior to implanting the ions in the surface of the body a masking layer is provided over the pre-selected area of the surface of the body, and the masking layer is removed after the ions are implanted in the surface of the body.

4. A method in accordance with claim 1 wherein the coating layer is of a material which forms an oxide bond with the material of the body.

References Cited

UNITED STATES PATENTS

| | | | |
|---|---|---|---|
| 3,622,382 | 11/1971 | Brack et al. | 117—93.3 X |
| 3,562,022 | 2/1971 | Shifrin | 117—93.3 X |
| 3,501,833 | 3/1970 | Spiegler | 117—212 X |
| 3,458,368 | 7/1969 | Haberecht | 117—212 X |

ALFRED L. LEAVITT, Primary Examiner

K. P. GLYNN, Assistant Examiner

U.S. Cl. X.R.

117—5.5, 93.3; 148—1.5